US012416964B2

(12) United States Patent
Dai et al.

(10) Patent No.: US 12,416,964 B2
(45) Date of Patent: Sep. 16, 2025

(54) METHODS AND APPARATUS FOR BI-DIRECTIONAL CONTROL OF COMPUTING UNIT FREQUENCY

(71) Applicant: Intel Corporation, Santa Clara, CA (US)

(72) Inventors: Jianwei Dai, Portland, OR (US); Jianfang Zhu, Portland, OR (US); Ivan Chen, Taipei (TW); Deepak Samuel Kirubakaran, Hillsboro, OR (US); Rajshree Chabukswar, Sunnyvale, CA (US); Richard Winterton, Provo, UT (US); Houfei Chen, Campbell, CA (US)

(73) Assignee: Intel Corporation, Santa Clara, CA (US)

( * ) Notice: Subject to any disclaimer, the term of this patent is extended or adjusted under 35 U.S.C. 154(b) by 755 days.

(21) Appl. No.: 17/557,034

(22) Filed: Dec. 20, 2021

(65) Prior Publication Data
US 2022/0113781 A1  Apr. 14, 2022

(51) Int. Cl.
G06F 1/00 (2006.01)
G06F 1/324 (2019.01)

(52) U.S. Cl.
CPC ............................ G06F 1/324 (2013.01)

(58) Field of Classification Search
CPC ...... G06F 1/324; G06F 1/3228; G06F 1/3243; G06F 9/4893; Y02D 10/00
See application file for complete search history.

(56) References Cited

U.S. PATENT DOCUMENTS

| 2014/0229750 | A1* | 8/2014 | Bhandaru | G06F 1/3203 713/320 |
| 2016/0170468 | A1* | 6/2016 | Bhandaru | G06F 1/3275 713/322 |
| 2018/0060123 | A1* | 3/2018 | Weissmann | G06F 9/4806 |
| 2019/0041962 | A1* | 2/2019 | Ananthakrishnan | G06F 1/324 |

* cited by examiner

Primary Examiner — Xuxing Chen
(74) Attorney, Agent, or Firm — Hanley, Flight & Zimmerman, LLC

(57) ABSTRACT

Methods and apparatus for bi-directional control of computing unit frequency are disclosed. An example apparatus to control a frequency of a computing unit includes instructions, memory in the apparatus, and processor circuitry. The processor circuitry is to determine a performance hint from a first register, the performance hint corresponding to a requested performance of the computing unit for executing a thread associated with software, determine power and performance (PnP) statistics pertaining to the thread from a second register, control the frequency of the computing unit based on the performance hint and the PnP statistics, and provide a pressure of the computing unit to the software.

22 Claims, 11 Drawing Sheets

METHODS AND APPARATUS FOR BI-DIRECTIONAL CONTROL OF COMPUTING UNIT FREQUENCY

FIELD OF THE DISCLOSURE

This disclosure relates generally to computing devices and, more particularly, to methods and apparatus for bi-directional control of computing unit frequency.

BACKGROUND

As personal computing systems continue to evolve, efforts have been made toward improving an overall user experience. In particular, aspects such as responsiveness and battery life have been identified to affect the user experience. Accordingly, various techniques have been developed to improve the user experience at multiple layers and/or portions of such personal computing systems. For example, at an application layer, various software-centric techniques have been developed to improve power efficiency. At an operating system level, various techniques involving identifying background activities and collaborating with a system on chip (SOC) architecture have been implemented to execute the background activities in low-power mode to reduce power consumption. At an SOC level, many hardware techniques have also been developed to improve power efficiency, such as hardware autonomous frequency selection techniques to accommodate relatively quick execution variations from workloads.

Figure 1:
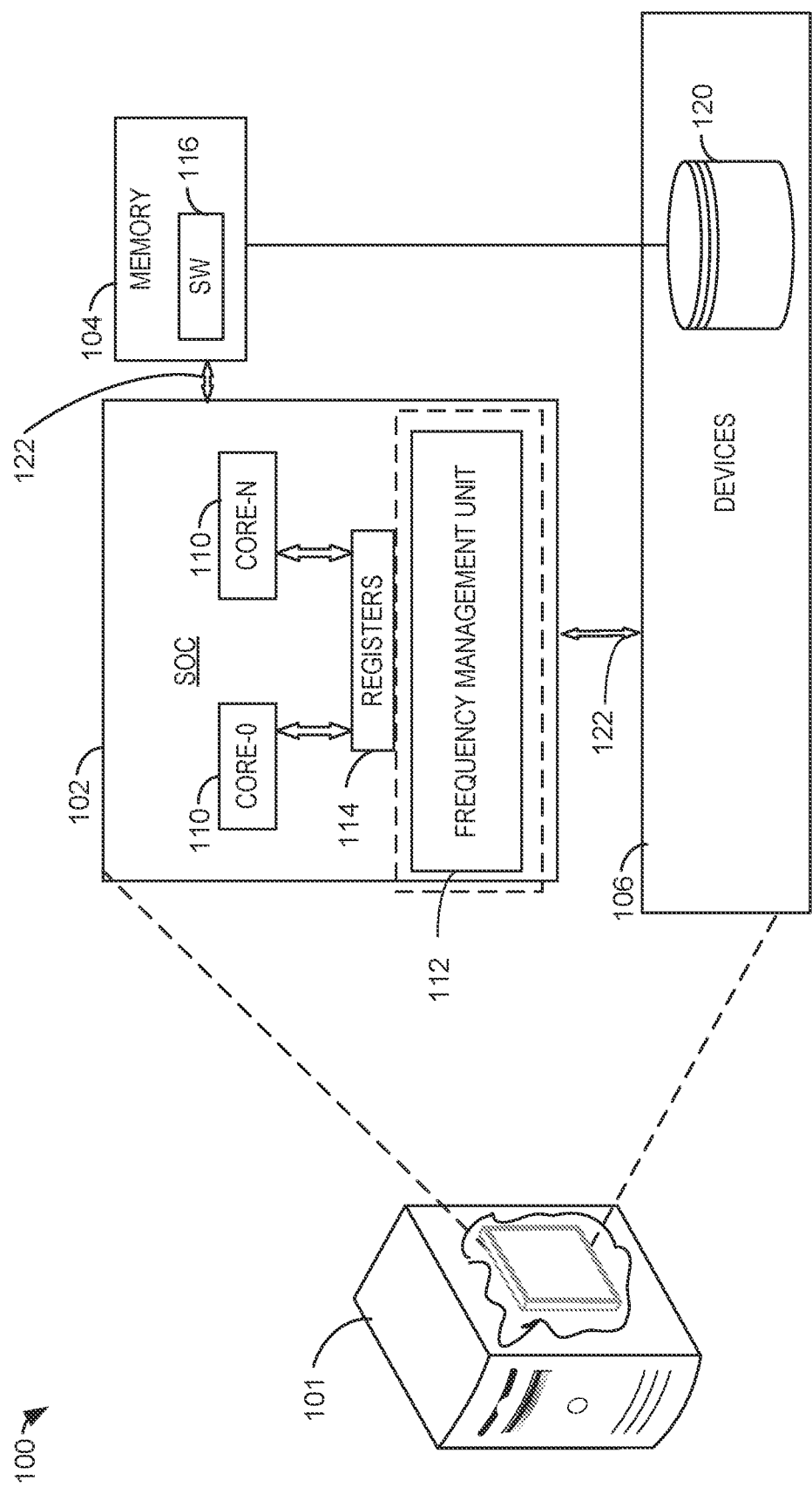
FIG. 1 is a schematic illustration of an example computing system in accordance with teachings of this disclosure.

In general, the same reference numbers will be used throughout the drawing(s) and accompanying written description to refer to the same or like parts. The figures are not to scale. Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Methods and apparatus for bi-directional and closed-loop control of computing unit frequency are disclosed. Some known system on chip (SOC) implementations utilize hardware-power (HWP) or speed shift technology, which can allow an SOC and an operating system (OS) to collaborate and control core frequency to achieve improved power and performance (PnP) results. In particular, a computing unit, such as a core (e.g., a computing core, a logical core, etc.) of an SOC, can increase its frequency based on the core frequency being less than a target speed, and a determination that an overall performance of the core will increase along with the frequency. In some known systems, the SOC calculates expected performance targets for its cores based on OS inputs, such as an energy performance preference (EPP) interface. For example, an EPP value of approximately 33 can be translated into 30% of core utilization. Further, assuming an evaluation interval is 1 millisecond (ms) when an OS requests an EPP of 33 for a compute core, some known SOC hardware will speed up the execution on that core until the core can finish the execution in 30% of 1.0 ms, which equates to 0.30 ms, for example.

However, in such known systems, the SOC monitoring of core execution to calculate the core's utilization is typically performed at an overall core level and does not generally account for differences between software threads. As a result, these known systems can result in over-subscribing or under-subscribing of a core frequency due to core execution statistics from prior thread execution, which is referred to as cross-thread contamination herein. In other words, these known systems control the core from a high-level perspective as opposed to utilizing the granularity of software threads.

Further, in known systems, OS layers have a single control manner, parameter and/or variable of control (e.g., "a single knob") to provide hardware, such as an SOC package, information via an HWP interface. In such known systems, a single control in a foreground application, such as video conferencing or file copying, may not be sensitive and/or responsive to frequency bursts that reach maximum processor frequency ranges, which are sometimes referred to as "turbo" frequency ranges. Due to performance requirements being met at relatively lower frequencies, power is, thus, wasted, thereby resulting in power inefficiencies. As result, the known systems can cause a core to utilize a higher frequency and, thus, increased power with little to no benefits gained from increasing the frequency.

Examples disclosed herein enable a bi-directional closed-loop feedback control between a computing unit (e.g., a computing core, an SOC core, a processor core, a memory unit or portion, a cache unit or portion, etc.) and/or an individual performance unit/individual logical block (IP) of a performance-based device (e.g., a processor, an SOC package, an SOC, a memory controller, a cache controller, etc.) that executes software (e.g., software layers, software thread layers, etc.) and/or firmware. According to examples disclosed herein, the aforementioned feedback control is implemented to dynamically adapt inputs to an SOC, for example, thereby accurately and efficiently utilizing the SOC to achieve improved PnP results. In other words, examples disclosed herein enable control of the SOC with improved granularity pertaining to software threads, thereby enabling improved control along with increased power efficiency while maintaining a desired software performance level. As a result, examples disclosed herein can enable significant power conservation as well as increased battery life of computing devices.

Examples disclosed herein can control a frequency of a computing unit and/or IP (e.g., a computing core, a cache performance unit, a memory performance unit, etc.) based on instructions and/or feedback from software. According to examples disclosed herein, processor circuitry executes instructions to access or read a performance hint from a first register. The performance hint is received from the software and corresponds to a requested performance for executing a software thread of the software by the computing unit. In turn, according to some examples disclosed herein, the processor circuitry retrieves power and performance (PnP) statistics pertaining to the software thread from a second register, determines a performance target of the computing unit based on the performance hint and the PnP statistic, and controls the frequency of the computing unit based on the performance target. Further, the example processor circuitry provides pressure data (e.g., data pertaining to the actual execution of the software thread pertaining to the computing unit) to the software, thereby defining a bi-directional control scheme and facilitating further control of the computing unit by the software (e.g., the software issues further performance hints based on receiving the pressure data), firmware and/or other instructions.

According to some examples disclosed herein, the pressure data, such as a calculated pressure (e.g., a core pressure) of the computing unit, is stored in a third register. In particular, the third register can be utilized and/or accessed by the software for further control of the computing unit (e.g., further performance hints to be provided to the processor circuitry for executing the software thereon based on the pressure). In other words, the pressure can be provided to the software as feedback.

In some examples, the processor circuitry determines whether the performance hint from the software and/or a thread of the software is non-compliant and/or abusive (e.g., whether the performance hint corresponds to a frequency that could damage an SOC associated with the computing unit and/or hardware associated with the SOC). In some such examples, when the processor circuitry determines that instructions exceed a threshold level of non-compliance and/or abuse (e.g., a threshold value indicating a probability of non-compliant instructions), the processor circuitry can place the SOC in a legacy mode such that the computing unit no longer responds to and/or is controlled by the performance hint from the software. For example, the legacy mode can correspond to operation of the computing unit and/or the associated SOC in a mode in which overall parameters thereof (e.g., an overall core utilization) are used to control a frequency (as opposed to controlling the computing unit and/or the SOC based on software threads). In some examples, the processor circuitry calculates a pressure of the computing unit so that the pressure can be provided to the software.

As used herein, the terms "computing unit" and "IP" refer to a logical/discrete computational and/or processing unit for which a performance thereof can be adjusted (e.g., via a controllable frequency level). Accordingly, the terms "computing unit" and "IP" can correspond to a performance-controlled unit of a compute core, a cache and/or memory, all of which can have an operational frequency. As used herein, the term "performance hint" refers to a request, instruction and/or command implemented for a requested performance of at least one computing unit. As used herein, the terms "pressure" and "core pressure" refer to an indication of a utilization and/or degree of use of the computing unit or IP.

FIG. 1 is a schematic illustration of an example computing system 100 in accordance with teachings of this disclosure. In the illustrated example of FIG. 1, the computing system 100 includes a computing device (e.g., a circuit board, a motherboard, a computer, a mobile device, a tablet, a PC, a laptop, an appliance, a network device, etc.) 101, which, in turn, includes an SOC (e.g., an SOC package) 102. In this example, the SOC 102 is electrically and/or communicatively coupled to memory 104, which is implemented as random access memory (RAM) in this example, as well as devices 106 (e.g., hardware devices, functional devices, computing devices, peripheral devices, etc.).

The SOC 102 of the illustrated example includes multiple functional computing units 110, which are implemented as processor cores (e.g., logical cores, processing cores, compute cores, computing cores, etc.) in this example, and a frequency management unit 112. In examples disclosed herein, the computing units 110 are further referred to as cores 110 for clarity. However, the computing units 110 do not necessarily have to be implemented by cores. For example, the computing units 110 could be implemented by logical performance units of cache, memory, a bus controller, etc. Further, the example SOC 102 is communicatively coupled to and/or interfaces with registers (e.g., register values) 114, which can be determined and/or accessed from the memory 104. In this example, the memory 104 is utilized for executing at least one thread of software 116 by the SOC 102. The software 116 can be stored in a storage 120 of devices 106. The devices 106 can include hardware and/or peripherals associated with and/or included by the computing device 101.

As will be discussed in greater detail below in connection with FIGS. 2-10, in operation, the SOC 102 executes threads of the software 116 by utilizing the memory 104. In particular, the threads associated with the software 116 are executed by the cores 110 of the SOC 102. In the illustrated example, the software 116 provides a performance hint (e.g., a performance request, a core throttling request, etc.) to the frequency management unit 112 for executing a thread of the software 116 and, in turn, the request is stored, held and/or designated as a first one of the registers 114. In the illustrated example, a second one of the registers 114 includes PnP statistics associated with the aforementioned thread.

Based on the performance hint of the first one of the registers 114 and the PnP statistics associated with the software 116 stored in the second one of the registers 114, the example frequency management unit 112 controls and/or selects a frequency (e.g., selects from an array of frequencies) of at least one of the cores 110 (e.g., the one of the cores 110 executing a thread of the software 116) and provides and/or outputs a performance indicator, such as a pressure (e.g., a core pressure) for example, back to the software 116 as a third one of the registers 114 while or after the software 116 is executed, thereby defining a bi-directional closed-loop control of performance of the core 110. In some examples, the software 116 accessor retrieves the third one of the registers 114 from the memory 104. In turn, the software 116 of the illustrated example can provide an additional further request and/or performance hint to the frequency management unit 112 based on the pressure associated with the third one of the registers 114. In this example, the PnP statistics of the second one of the registers 114 are updated as the core 110 executes the thread in response to the requested performance hint from the software 116 and the controlled frequency of the core 110, as directed by the frequency management unit 112.

In some examples, if the performance hint from the software 116 is determined to be non-compliant (e.g., erroneous and/or abusive), the frequency management unit 112 will prevent the core 110 from being controlled by the performance hint (e.g., the core 110 returns to a legacy mode of operation). In some such examples, if the performance hint is non-compliant, the core 110 is directed to operate in a legacy mode in which an overall utilization of the core 110 is managed (e.g., independent of software requests).

While the cores 110 are implemented as processor cores in this example, the cores 110 can be implemented as individual computing units of memory (e.g., random access memory, cache memory, a network controller, etc.), a device controller (e.g., a hard disk controller, a memory controller, a cache controller, etc.) or any other appropriate device that manages performance of discrete and/or individual computing units. In other words, examples disclosed herein are not solely limited to SOCs and/or SOC packages.

While the example of FIG. 1 shown in the context of a computing device 101, which is implemented as a personal computer in this example, examples disclosed herein can be implemented with any other type of computing device, such as a tablet, a laptop computer, a mobile device, a mobile phone, a console, a network device, a media device, peripheral device and/or a device controller, etc. Further, examples disclosed herein can be implemented in computing systems, such as networks or cloud-based systems, for example. Accordingly, example disclosed herein can be implemented in any appropriate computing and/or network topology.

Figure 2:
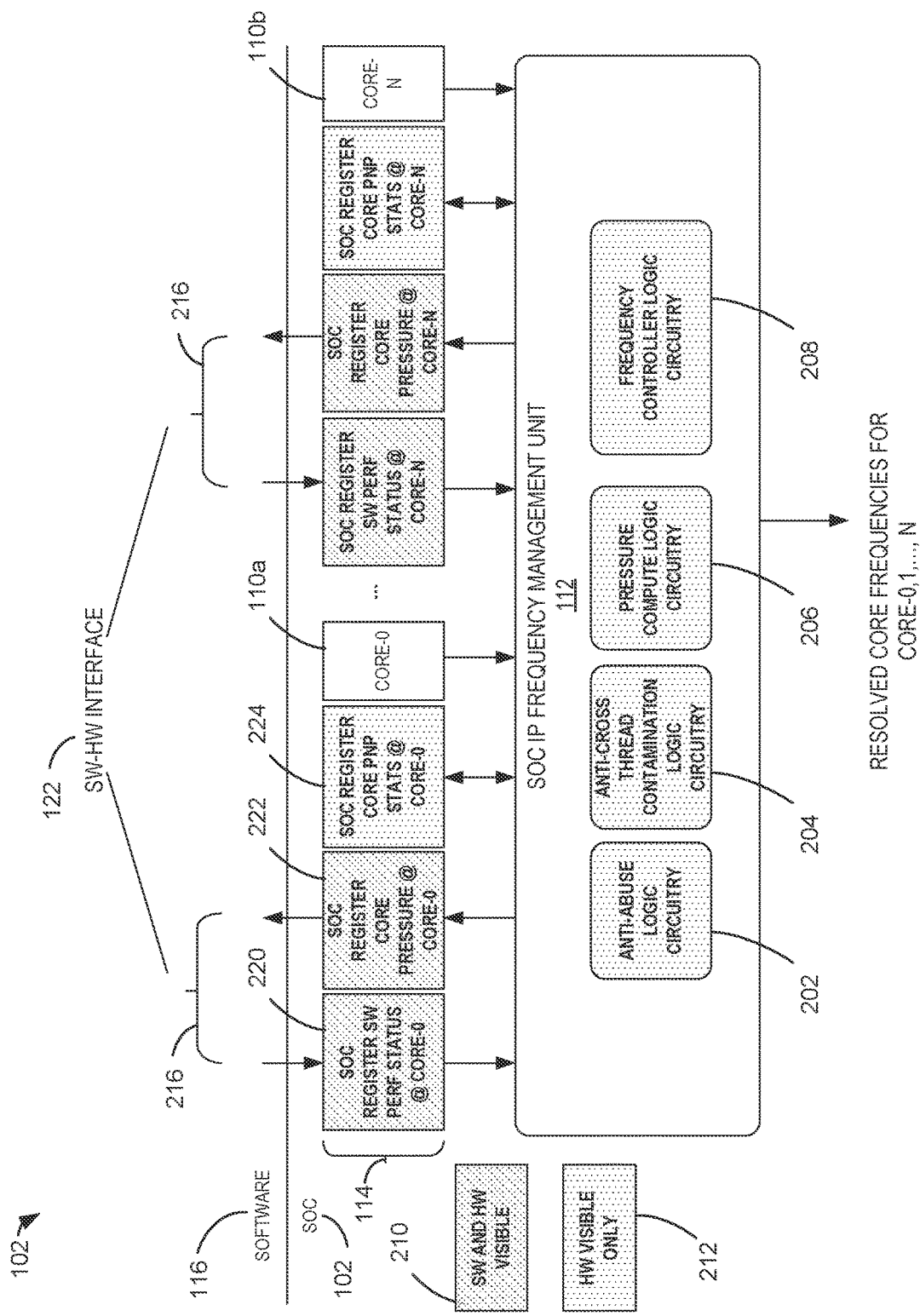
FIG. 2 is a block diagram of an example system on chip (SOC) implementation in accordance with teachings of this disclosure.

FIG. 2 is a block diagram of an example SOC implementation in accordance with teachings of this disclosure. The example SOC implementation can be implemented with the SOC 102 shown and described above in connection with FIG. 1. In the illustrated example of FIG. 2, the example frequency management unit 112 is implemented to enable closed-loop and/or bi-directional control of performance of at least one of the cores 110. The example frequency management unit 112 of FIG. 2 may be instantiated (e.g., creating an instance of, bring into being for any length of time, materialize, implement, etc.) by processor circuitry, such as a central processing unit executing instructions. Additionally or alternatively, the example frequency management unit 112 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by one or more virtual machines and/or containers executing on the microprocessor.

In the illustrated example, the aforementioned frequency management unit 112 includes example anti-abuse logic circuitry 202, example anti-cross-thread-contamination logic circuitry 204, example pressure compute logic circuitry (e.g., core pressure compute logic circuitry) 206, and example frequency controller logic circuitry (e.g., a software performance hint guided frequency selection logic circuitry) 208.

The example anti-abuse logic circuitry 202 is hidden and/or inaccessible by the software 116, and is implemented in the example SOC 102 to determine whether the frequency management unit 112 is to be controlled by and/or respond to software performance hints/requests from the software 116. In this example, the anti-abuse logic circuitry 202 can switch the SOC 102 and/or the core 110 to a legacy mode in which at least one the cores 110 is not controlled by and/or operates independently from the software performance hint associated with the software 116 based on an indication (e.g., a probability exceeding a threshold probability) that the performance hint may include and/or direct non-compliant instructions (e.g., instructions that can exceed operating parameters of the core 110). In other words, the anti-abuse logic circuitry 202 of the illustrated example can isolate threads of the software 116 and/or the software 116 from being utilized for controlling a frequency of the core(s) 110, thereby preventing misuse and/or damage of the core(s) 110 in some instances.

The anti-cross-thread-contamination logic circuitry 204 of the illustrated example analyzes execution of a software thread previously executed by at least one of the cores 110, for example. In the illustrated example, the anti-cross-thread-contamination logic circuitry 204 analyzes the PnP data associated with the software thread. In this particular example, the PnP data as stored in one of the registers 114 and is related to the thread that was previously executed by the core 110. In turn, data associated with the PnP data of the core 110 is utilized to control a frequency of the core 110. The example pseudocode below illustrates an example anti-cross-thread contamination logic algorithm that can be implemented in examples disclosed herein:

```
while (thread-0 is running) {
    SOC logs the following info into register:
    THREAD_MISC_PNP_STATS
        • actual core utilization
        • core frequency
}
while (thread-0 is switching out): {
    Core saves the content of the THREAD_MISC_PNP_STATS
    register and other registers as well
}
...
while (thread-0 is switching back): {
    Core restores the contents of THREAD_MISC_PNP_STATS register
    SOC IP frequency management unit will force its captured
    core_utilization to THREAD_MISC_PNP_STATS.actual_core_utilization
    Arm a hysteresis timer;
}
while (hysteresis timer is not expired) {
    SOC uses the restored core_utilization for calculating core
    frequency;
    SOC calculates the actual core_utilization from the system;
}
SOC uses the actual core_utilization to compute core frequency.
```

As can be seen above, in some examples, a hysteresis timer is utilized in which restored settings are employed while the core 110 is monitored. The example pseudocode above is only an example, and any other appropriate algorithm and/or methodology can be implemented instead.

The example pressure compute logic circuitry 206 determines and/or calculates a pressure (e.g., a core pressure) of the core 110 associated with execution of the thread of the software 116. In the illustrated example, the pressure is stored and/or designated as one of the registers 114 and provided to the software 116, thereby defining a bi-directional control loop between the software 116 and the core 110. In particular, the pressure is provided to the software 116 as feedback for the software 116 that requested a frequency and/or performance level from the core 110. In turn, the software 116 can adjust subsequent performance hints for the core 110. For example, the software 116 can evaluate performance thereof based on the performance hint previously provided and adjust a subsequent performance hint accordingly.

In some examples, based on pressure feedback to the software 116, when the software 116 does not receive a sufficient amount of performance delivered from the SOC 102 and/or at least one of the core(s) 110 (e.g., the software 116 detects a lower frame rate for a video-based application), the software 116 can determine whether the insufficient performance delivered by the core(s) 110 is due to a relatively large degree of frequency reduction from the SOC 102 and/or the core(s) 110 or as a result of a limited maximum frequency that the SOC 102 and/or the core(s) 110 can support, either of which may be determined, via the aforementioned pressure. To allow the software 116 to make the distinction, examples disclosed herein utilize calculation and/or determination of the pressure. Accordingly, an example calculation to indicate performance of the core(s) 110 (e.g., actual frequency or measured frequency of the core(s) 110) relative to its maximum achievable frequency is shown in equation (1) below. However, the maximum achievable frequency and/or the pressure of the core(s) 110 be calculated in any other appropriate manner taking into account other parameters and/or factors.

$$IP\ pressure = \frac{actual\ IP\ frequency}{max\ achievable\ IP\ frequency} \qquad (1)$$

In this example, to ensure that this information can be correctly paired with a software thread, the SOC 102 logs information into a register SOC_OUTPUT.IP_PRESSURE, for example, which can be saved/restored as part of the thread context switch flow, for example. In turn, the register can be used by the software 116 to adjust subsequent performance hints to the SOC 102, for example. Particularly, the software 116 can reduce its performance requests for the SOC 102 upon determining that the pressure corresponds to a value that is close to or exceeding a maximum frequency of the core 110.

In the illustrated example of FIG. 2, the frequency controller logic circuitry 208 controls and/or selects the frequency of at least one of the cores 110. In some examples, the frequency controller logic circuitry 208 calculates a performance target, which is expressed a frequency of the core 110, based on the performance hint pertaining to a software thread and/or the /PnP data associated with the software thread. In turn, the performance target can be used to direct a frequency of at least one of the cores 110.

In some examples, the frequency controller logic circuitry 208 selects a frequency from an array of frequencies and/or a table of frequencies based on the performance target of the core 110. According to examples disclosed herein, the frequency is selected based on the performance hint, the PnP data, and/or the determination a determination that the performance hint does not indicate either abusive and/or non-compliant instructions.

In the illustrated example of FIG. 2, portions of the example implementation that are visible and/or accessible to both the software 116 and hardware of the computing device 101 and/or the frequency management unit 112 are designated by a pattern 210. Similarly, a pattern 212 indicates portions of the example implementation that are only visible to the hardware of the SOC 102 and/or the frequency management unit 112. In other words, some portions of examples disclosed herein can be effectively hidden from the software 116, thereby enabling a layer of security and/or prevention of potential damage to the computing device 101 and/or the SOC 102. Accordingly, arrows 216 in-65dicate an exchange of data and/or information between the SOC 102 and/or the frequency management unit 112 with the software 116 (e.g., threads and/or layers of the software 116, etc.).

According to the illustrated example, the interface (e.g., a software-hardware interface) 122, designated as the SW-HW INTERFACE in FIG. 2, facilitates communication between the SOC and the software 116, as indicated by data inputs/outputs 216, such that a performance hint 220 is provided to the frequency management unit 112 as a first one of the registers 114 for controlling the core 110a, which is designated as "CORE-O" in this example. Further, the pressure 222 associated with a software thread is forwarded and/or provided to the software 116 as a second one of the registers 114. In this example, PnP statistics 224 are stored as a third one of the registers 114 and are retrieved, updated and/or stored by the frequency management unit 112. Further, the software 116 of the illustrated example does not have access to the PnP statistics 224 while the power management unit 112 accesses and updates the third one of the registers 114 with the PnP statistics 224, as they are updated, in this example. Similarly, the example core 110b is controlled in a similar manner to that of the core 110a (e.g., frequency of the core 110b is controlled by a software performance hint that may or may not be associated with the software 116 having threads executed by the core 110a).

Figure 3:
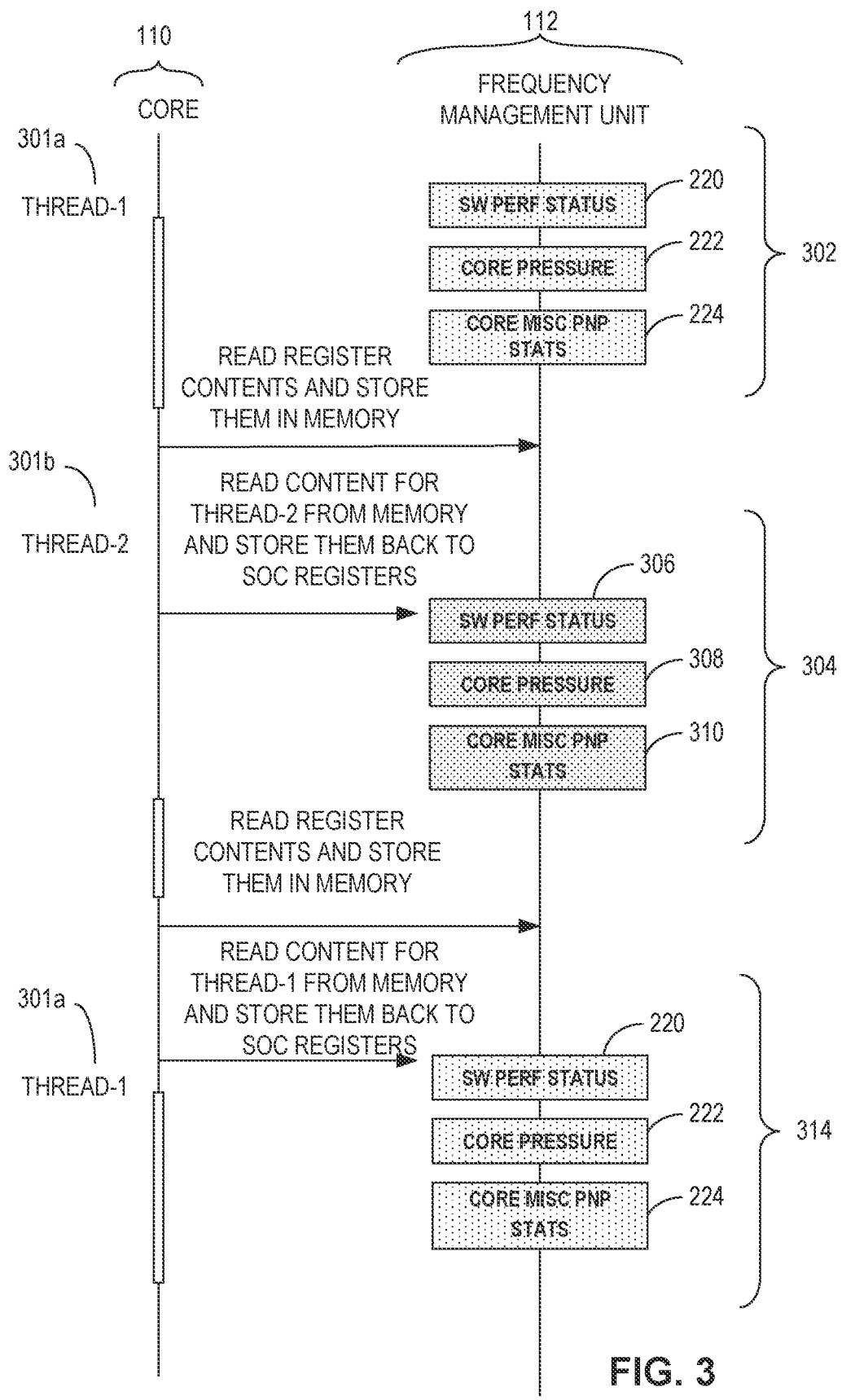
FIG. 3 is an example process flow that can be implemented in examples disclosed herein.

FIG. 3 is an example process flow that can be implemented in examples disclosed herein. In the illustrated example of FIG. 3, the core 110 of the SOC 102 is implementing threads 301a, 301b, designated as "THREAD-1" and "THREAD-2," respectively, in FIG. 3. In this example, the threads 301a, 301b are associated with the software 116 of FIG. 1. Further, in this example, the power management unit 112 and/or the software 116 accesses and updates the registers 114 associated with the performance hint 220, the pressure 222 and the PnP statistics 224 as the threads 301a, 301b of the software 116 are executed (e.g., sequentially executed) by the core 110.

In operation, at a step 302, the power management interface system 112 and/or the software 116 of the illustrated example stores register values in the registers 114 pertaining to the performance hint 220, the pressure 222, and the PnP statistics 224 as the thread 301a is first executed. In turn, at a step 304, register values pertaining to a performance hint 306, a pressure 308, and PnP statistics 310 of the thread 301b are read and stored subsequent to and/or during execution of the thread 301b. In this example, as the thread 301a is again executed by the core 110 at a step 314, data and/or information associated with the thread 301a is retrieved (e.g., from the memory 104) and stored back as the registers 114 with the performance hint 220, the pressure 222, and the PnP statistics 224. In this example, the thread 301a is executed based on the registers 114. Further, the pressure 222 associated with the core 110 executing the thread 301a is forwarded and/or provided to the software 116. In turn, at least one of the registers 114 is updated based on execution of the thread 301a during the aforementioned step 314.

While an example manner of implementing the example frequency management unit 112 of FIG. 1 is illustrated in FIG. 2, one or more of the elements, processes, and/or devices illustrated in FIG. 2 may be combined, divided, re-arranged, omitted, eliminated, and/or implemented in any other way. Further, the example anti-abuse logic circuitry 202, the example anti-cross-thread-contamination logic circuitry 204, the example pressure compute logic circuitry 206, the example frequency controller logic circuitry 208 and/or, more generally, the example frequency management unit 112 of FIG. 1, may be implemented by hardware alone or by hardware in combination with software and/or firmware. Thus, for example, any of the example anti-abuse logic circuitry 202, the example anti-cross-thread-contamination logic circuitry 204, the example pressure compute logic circuitry 206, the example frequency controller logic circuitry 208, and/or, more generally, the example frequency management unit 112, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example frequency management unit 112 of FIG. 1 may include one or more elements, processes, and/or devices in addition to, or instead of, those illustrated in FIG. 2, and/or may include more than one of any or all of the illustrated elements, processes and devices.

Flowcharts representative of example hardware logic circuitry, machine readable instructions, hardware implemented state machines, and/or any combination thereof for implementing the frequency management unit 112 of FIG. 1 is shown in FIGS. 4-7. The machine readable instructions may be one or more executable programs or portion(s) of an executable program for execution by processor circuitry, such as the processor circuitry 812 shown in the example processor platform 800 discussed below in connection with FIG. 8 and/or the example processor circuitry discussed below in connection with FIGS. 9 and/or 10. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 4-7, many other methods of implementing the example frequency management unit 112 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 4-7 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 4:
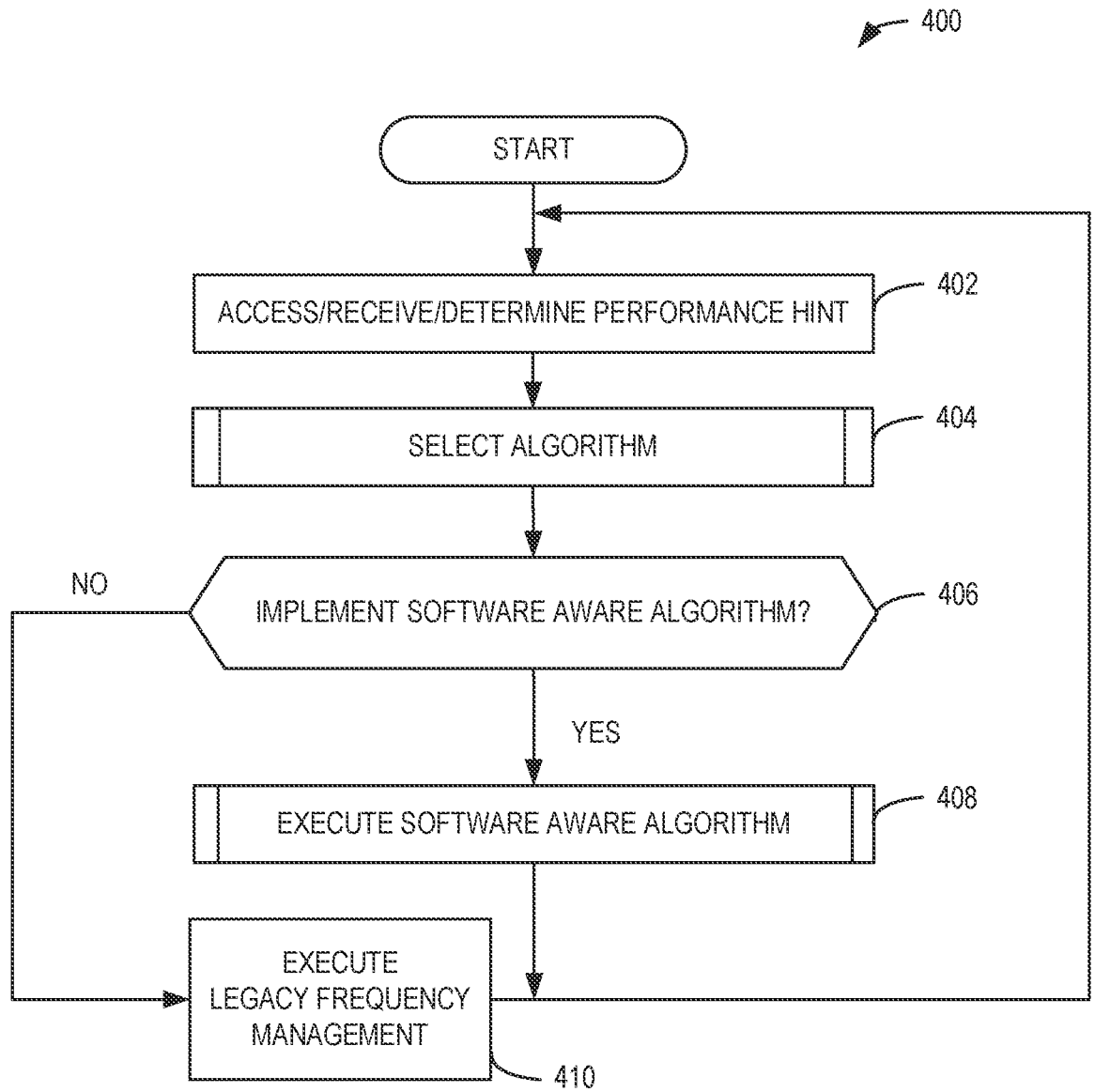
FIGS. 4-7 are flowcharts representative of example machine readable instructions and/or example operations that may be executed by example processor circuitry to implement the example computing system of FIG. 1 and/or the example SOC implementation of FIG. 2.

FIG. 4 is a flowchart representative of example machine readable instructions and/or example operations 400 that may be executed and/or instantiated by processor circuitry to enable a bi-directional closed-loop control of a frequency of the SOC 102 and/or a computing unit, such as the example core 110. The machine readable instructions and/or the operations 400 of FIG. 4 begin at block 402, at which the example anti-abuse logic circuitry 202 obtains, receives, accesses and/or retrieves a performance hint pertaining to a thread of the software 116. In the illustrated example, the anti-abuse logic circuitry 202 is to prevent the software 116 from instructing the core 110 with erroneous and/or abusive instructions.

At block 404, as will be discussed in greater detail below in connection with FIG. 7, the example anti-abuse logic circuitry 202 selects an algorithm to execute the aforementioned thread. In the illustrated example of FIG. 4, the anti-abuse logic circuitry 202 selects between a legacy algorithm and a software aware algorithm in accordance with teachings of this disclosure. In this example, the selection is based on a presence of presence of non-compliant, abusive and/or erroneous instructions.

At block 406, the example anti-abuse logic circuitry 202 determines whether to implement the software aware algorithm based on the selection of the algorithm (block 404). If the software aware algorithm is to be implemented (block 406), control of the process proceeds to block 408. Otherwise, the process proceeds to block 410.

At block 408, if the software aware algorithm is selected (e.g., there is no presence of non-compliant, abusive and/or erroneous instructions from the software 116) (block 406), the anti-abuse logic circuitry 202 of the illustrated example enables execution of the software aware algorithm and, thus, enables bi-directional control between the software 116 and the computing unit. In other words, the example anti-abuse logic circuitry 202 enables the software 116 to request performance of the computing unit.

At block 410, in some examples, if the software aware algorithm is not selected (e.g., there is a presence of non-compliant, abusive and/or erroneous instructions) (block 406), the anti-abuse logic circuitry 202 of the illustrated example initiates and/or causes execution of a legacy mode in which the computing unit is controlled independently of at least one performance hint received from the software 116. In other words, in the legacy mode, the performance hint(s) from the software 116 can be ignored and/or isolated, for example.

Figure 5:
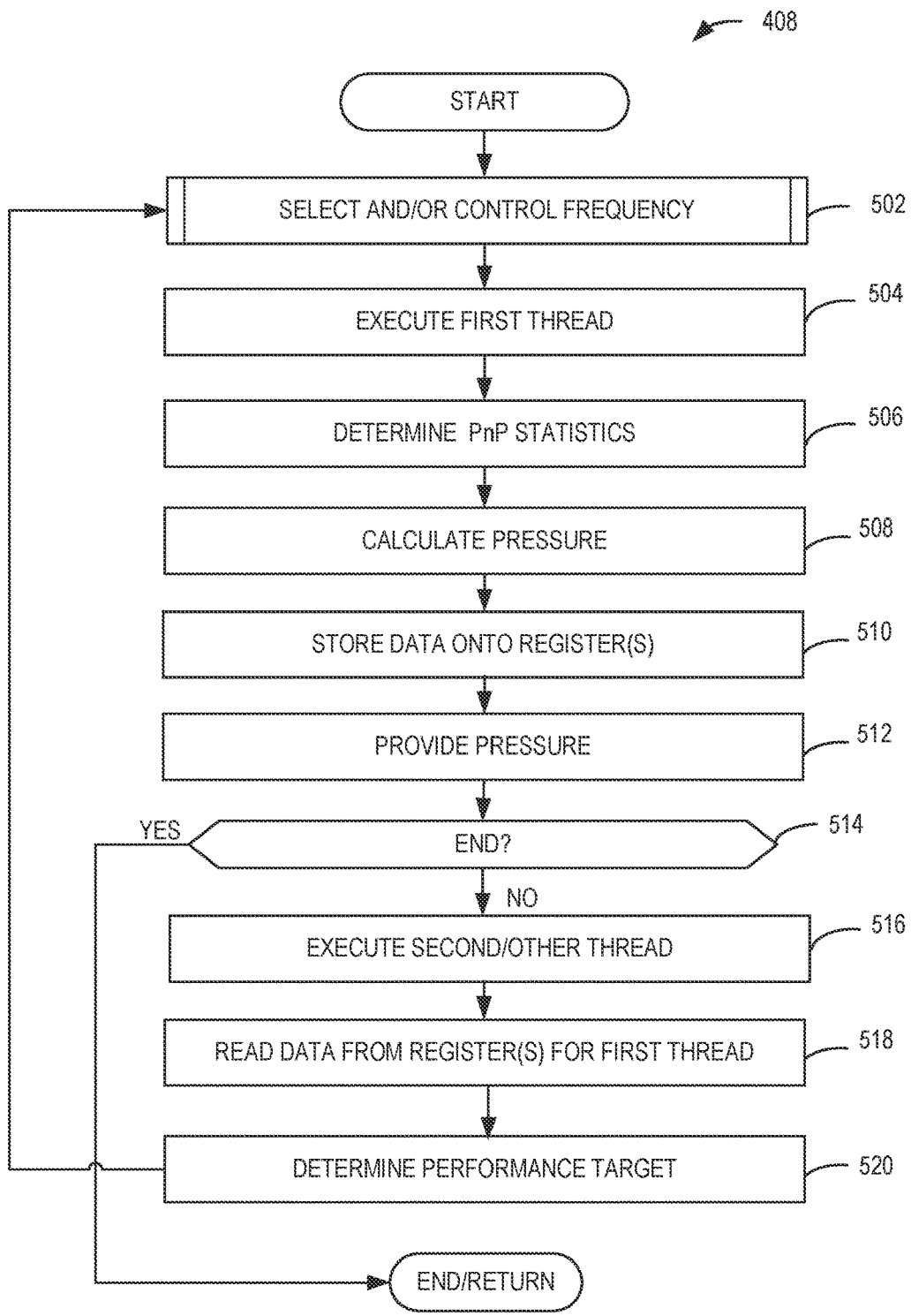

FIG. 5 is a flowchart representative of the subroutine 408 of the example machine readable instructions and/or example operations 400 of FIG. 4. In the illustrated example of FIG. 5, the anti-abuse logic circuitry 202 has not determined a presence of non-compliant instructions in a performance hint from the software 116 and, as a result, the performance hint from the software 116 can be utilized to control and/or manage a frequency or other performance parameter of the computing unit.

In this example, at block 502 and as will be discussed in greater detail below in connection with FIG. 6, the example frequency controller logic circuitry 208 selects and/or controls a frequency of the computing unit. In this example, if the thread has not been previously executed, the frequency of the computing unit is controlled based on the performance hint. According to examples disclosed herein, if the thread has been previously executed, the frequency can be controlled based on a performance target associated with block 520 described below. In some examples, the frequency controller logic circuitry 208 selects the frequency from an array of frequencies based on the performance hint, the pressure and/or the PnP statistics.

At block 504, the anti-cross-thread-contamination logic circuitry 204 and/or the example pressure compute logic circuitry 206 causes a first thread to be executed by the computing unit and monitors/logs execution of the first thread of the software 116 by the aforementioned computing unit. Additionally or alternatively, the example pressure compute logic circuitry 206 measures and/or determines parameters of the computing unit as the thread is being executed.

At block 506, the pressure compute logic circuitry 206 of the illustrated example determines and/or accesses PnP statistics corresponding to execution of the first thread of the software 116. The aforementioned PnP statistics can correspond to any of, but are not limited to, power dissipated by the computing unit, a level of performance (e.g., a power metric, a core utilization, instructions handled per time, a frequency, a throttle range, etc.).

At block 508, the example pressure compute logic circuitry 206 calculates and/or determines a pressure (e.g., a core pressure) of the computing unit. In the illustrated example, the pressure functions as a performance indicator and is equal to a quotient of a measured core frequency of the computing unit during the executing of the first thread divided by a maximum frequency of the computing unit. However, any other appropriate performance indicator and/or parameter can be implemented instead.

At block 510, in the illustrated example, the anti-cross-thread-contamination logic circuitry 204 and/or the core pressure compute logic 206 stores data onto at least one of the registers. In this example, a first one of the registers pertains to the performance hint from the software 116 while a second one of the registers pertains to the aforementioned pressure of the computing unit during execution of the first thread. Further, the PnP statistics associated with the execution of the first thread is stored in a third one of the registers, which is hidden and/or inaccessible from the software 116 in this example. In this example, the pressure associated with the second one of the registers is accessed and/or read by the software 116 and/or hardware associated with the software 116 for feedback to the software 116.

Additionally or alternatively, at block 512, the example pressure compute logic circuitry 206 provides the aforementioned pressure to the software 116 and/or at least one thread associated with the software 116. As mentioned above, the pressure can be provided to the software 116 as a third one of the registers. However, the pressure can be forwarded to and/or accessed by the software 116 in any appropriate manner.

At block 514, it is determined by the anti-cross-thread-contamination logic circuitry 204 and/or the example pressure compute logic circuitry 206 whether to end the process. If the process of FIG. 5 is to end (block 514), the process ends/returns. Otherwise, the process proceeds to block 516. The determination can be based on whether additional threads are to be executed, whether non-compliant instructions are indicated with sufficient probability, whether a new performance hint from the software 116 has been issued, determined accessed and/or retrieved etc.

At block 516, the anti-cross-thread-contamination logic circuitry 204 and/or the example pressure compute logic circuitry 206 causes and/or directs a second thread or other thread different from the first thread to be executed by the computing unit. The second or other thread can be associated with the software 116 or different software from that of the software 116. In some examples, the second or other thread is executed in a similar manner to the execution of the first thread shown in FIG. 5. In particular, the second or other thread can also have an associated performance hint, as well as its own associated PnP statistics and core pressure, for example. In other words, in some examples, the second or other thread can be implemented with a bi-directional control loop of the computing unit in addition to the first thread.

At block 518, in this example, the anti-cross-thread-contamination logic circuitry 204 and/or the core pressure compute logic 206 of the illustrated example reads data from at least one of the aforementioned registers. In this example, the anti-cross-thread-contamination logic circuitry 204 and/or the core pressure compute logic 206 reads the first, second and third ones of the registers. In some examples, the anti-cross-thread-contamination logic circuitry 204 reads data pertaining to the first thread and/or a performance hint from the register.

According to the illustrated example of FIG. 5, at block 520, in some examples, the anti-cross-thread-contamination logic circuitry 204 and/or the core pressure compute logic 206 determines the aforementioned performance target of the computing unit. In this example, the performance target is based on the performance hint and the PnP statistics (e.g., and in response to determining that the performance hint does not include non-compliant instructions). In some such examples, the process returns to block 502, whereby a frequency of the computing unit is controlled based on the performance target. In some examples, the performance target corresponds to a desired frequency of the computing unit.

Figure 6:
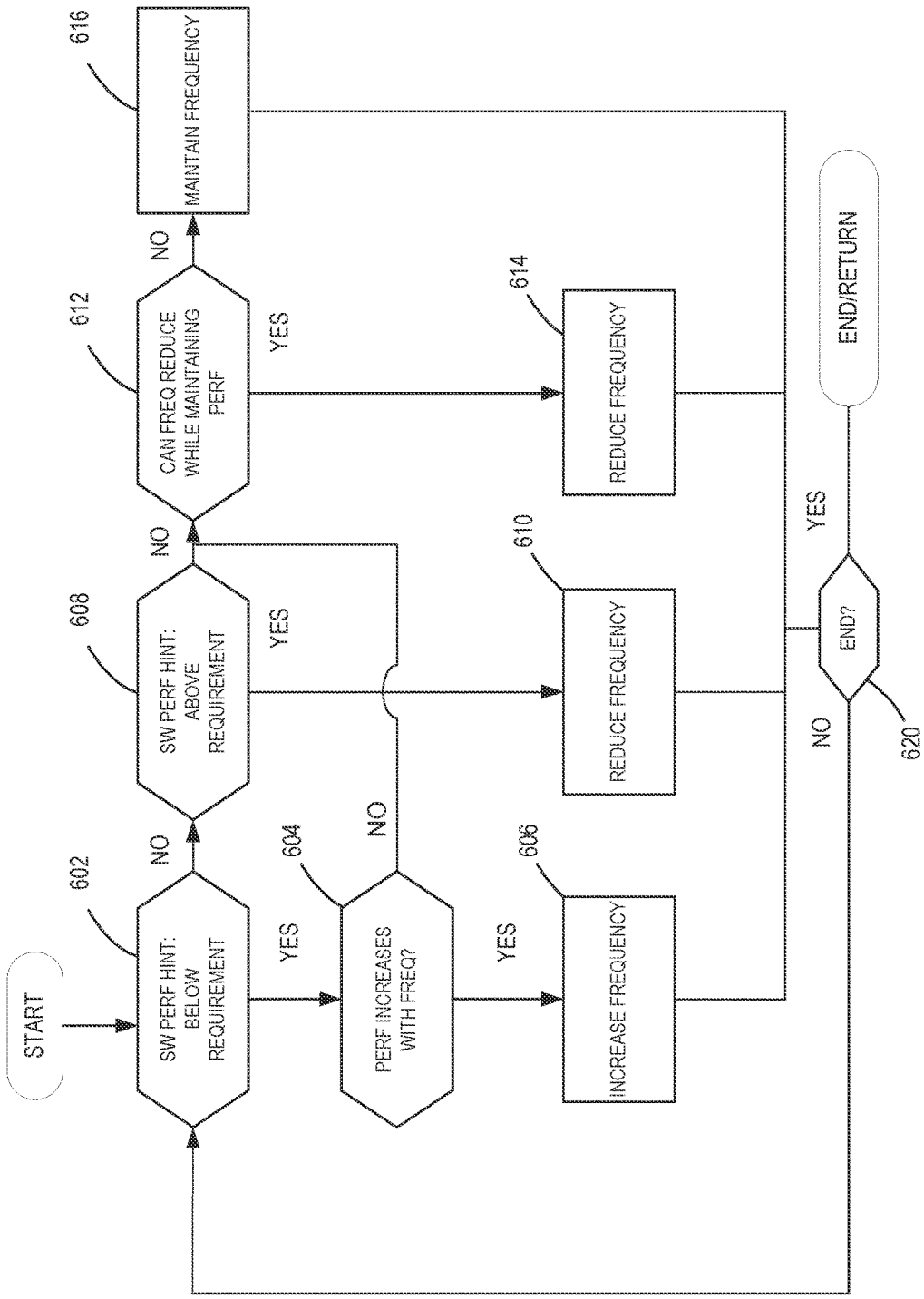

FIG. 6 is a subroutine 502 of the example machine readable instructions and/or example operations 408 of FIGS. 4 and 5. The example of FIG. 6 corresponds to an example algorithm for controlling a frequency of the computing unit based on an analysis of whether increasing frequency will yield significant performance of the computing unit.

At block 602, the anti-abuse logic circuitry 202 and/or the anti-cross-thread-contamination logic circuitry 204 determines whether the performance hint from the software 116 is below a requirement (e.g., a threshold requirement value). The requirement can pertain to a maximum performance and/or frequency of the computing unit.

At block 604, the example frequency controller logic circuitry 208 and/or the anti-cross-thread-contamination logic circuitry 204 determines whether performance of the computing unit increases with a frequency thereof. In other words, the example frequency controller logic circuitry can determine a degree of performance gains along with increased frequency, for example.

At block 606, if the performance of the computing unit increases with the frequency (block 604), the example frequency controller logic circuitry 208 increases the frequency of the computing unit.

At block 608, if the performance of the computing unit does not increase with the frequency (block 604), the anti-abuse logic circuitry 202 and/or the anti-cross-thread-contamination logic circuitry 204 determines if the performance hint from the software 116 is above the aforementioned requirement.

At block 610, if the performance hint is determined by the anti-abuse logic circuitry 202 and/or the anti-cross-thread-contamination logic circuitry 204 to be above the requirement (block 608), the frequency controller logic circuitry 208 of the illustrated example reduces the frequency of the computing unit.

At block 612, the example frequency controller logic circuitry 208 determines whether the frequency of the computing unit can be reduced while maintaining the performance thereof at a requisite and/or threshold performance level.

At block 614, if it is determined that the frequency of the computing unit can be reduced by the frequency controller logic circuitry 208 while maintaining the performance of the computing unit 110 at the aforementioned performance level (block 612), the example frequency controller logic circuitry 208 reduces the frequency of the core 110.

In the illustrated example, at block 616, if it is determined that the frequency of the computing unit cannot be reduced while maintaining the performance of the computing unit at the aforementioned performance level (block 612), the frequency controller logic circuitry 208 of the illustrated example maintains the frequency of the computing unit. In other words, the frequency controller logic circuitry 208 maintains the frequency at a relatively unchanged level (e.g., the frequency of the computing unit is maintained within 1-5% of a set value) based on whether the frequency can be reduced with a threshold degree of performance (e.g., a minimum level of performance). As a result, power usage can be reduced while maintaining the threshold degree of performance.

At block 620, the anti-cross-threaded contamination logic circuitry 204 and/or the example frequency controller logic circuitry 208 determines whether the example process of FIG. 6 is to end. The determination can be based on whether new or updated PnP data has been received, whether a current thread is finished being executed, whether a time duration has been met (e.g., a time duration for gathering PnP statistics, a pre-defined time duration corresponding to cycles of the SOC 102 and/or the core 110) and/or whether the computing unit is executing a new thread. If it is determined to end the process (block 620), the process ends/returns. Otherwise, the process returns to block 602.

The example subroutine 502 of FIG. 6 is only an example of controlling a frequency of at least one of the computing units (e.g., the cores 110). Accordingly, any other appropriate methodology, algorithm or logic can be implemented. Similarly, any other appropriate variable and/or parameter related to the computing unit and/or the SOC 102 can be implemented instead. For example, an appropriate variable and/or parameter can include, but is not limited to, SOC/core temperature(s), SOC/core power utilization/draw, utilization of multiple cores of the SOC 102 (e.g., a threshold number of instruction per core of the SOC 102 being exceeded), etc.

Figure 7:
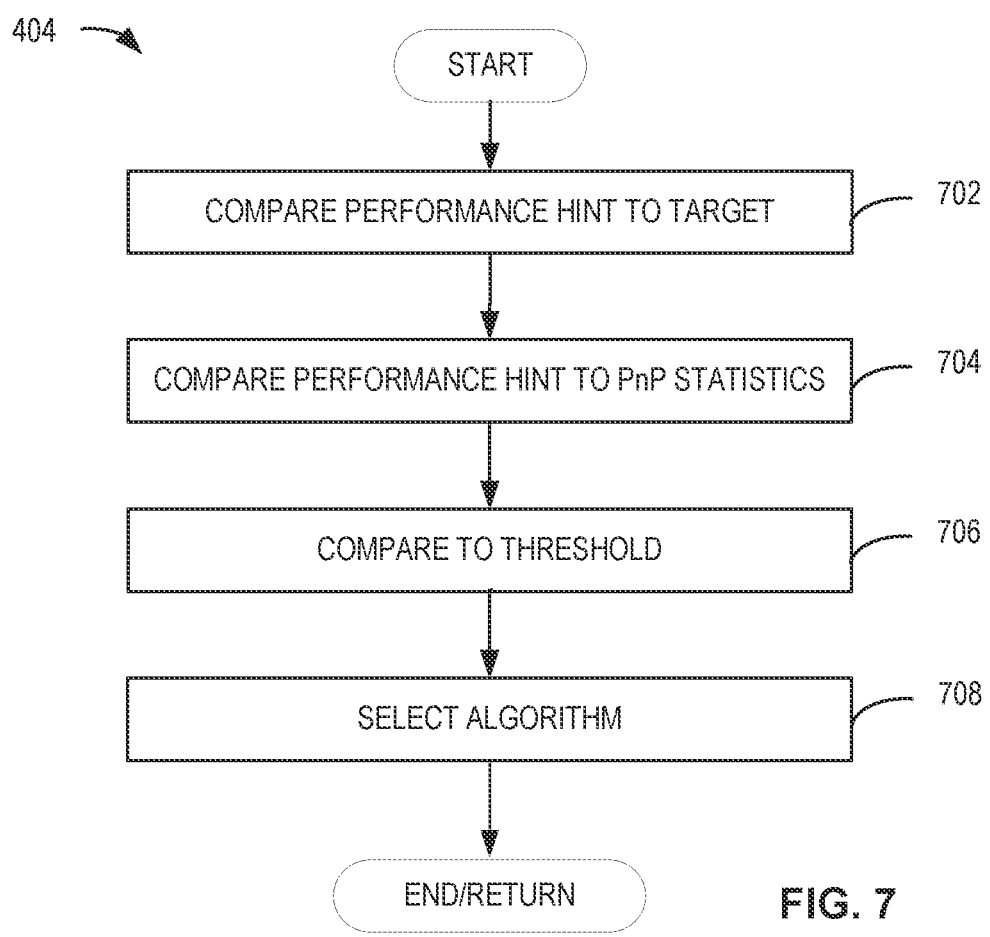

FIG. 7 is a subroutine 404 of the example machine readable instructions and/or example operations 400 of FIG. 4. The example subroutine 404 corresponds to an example algorithm selection to prevent non-compliant and/or abusive instructions from adversely affecting operation of the computing unit and/or hardware associated with the computing unit, such as the SOC 102 or the computing device 101, for example.

At block 702, the anti-abuse logic circuitry 202 of the illustrated example compares the aforementioned performance hint to a target performance. In some examples, the target performance can associate a requested core pressure of the core 110 when executing the thread of the software 116. In some examples, the target performance corresponds to PnP statistics of the core 110 with a similar and/or identical performance hint (e.g., a previously provided performance hint).

At block 704, in some examples, the anti-abuse logic circuitry 202 compares the aforementioned performance hint to PnP statistics. In some such examples, the PnP statistics associated with complying with the performance hint In this example, at block 706, the anti-abuse logic circuitry 202 determines a probability and/or likelihood of a presence of non-compliant instructions of the performance hint from the software 116 and compares the probability and/or the likelihood to a threshold that corresponds to abusive and/or erroneous instructions that can cause malfunction or undesirable operation of the computing unit of a device and/or package (e.g., the SOC 102). In some examples, the anti-abuse logic circuitry 202 examines and/or analyzes the performance hint for potential malicious instructions (e.g., instructions associated the software thread and/or a performance hint that can cause significantly degraded performance of the computing unit) to determine the probability and/or the likelihood of non-compliant instructions.

At block 708, the example the anti-abuse logic circuitry 202 selects one of a legacy algorithm or a software aware algorithm based on the aforementioned probability and/or likelihood of a presence of non-compliant instructions to yield a selected algorithm and the process ends/returns. The example process may be represented by the following pseudocode, for example:

```
while (thread-0 is switched in) {
    if (SW_INPUT.perf_hint == x % target) {// x % < 100%
    increase frequency;
    if (SW_INPUT.perf_hint >=
    THREAD_MISC_PNP_STATS.prior_perf_hint)
{
        THREAD_MISC_PNP_STATS.abuse_counter ++
    }
    if (THREAD_MISC_PNP_STATS.abuse_counter ==
    ABUSE_THRESHOLD) {
        THREAD_MISC_PNP_STATS.abuse_detected=1;
    }
    If (THREAD_MISC_PNP_STATS.abuse_detected==1) {
        Switch to legacy algorithm.
    } else {
        Continue with new algorithm.
        }
    }
}
```

In some examples, the anti-abuse logic circuitry 202 and receives inputs including an existing and/or legacy algorithm, and a software aware algorithm as inputs for a corresponding thread of the software 116. In turn, the anti-abuse logic circuitry 202 selects one of the inputs based on the aforementioned probably and/or likelihood of non-compliant instructions. In other words, the anti-abuse logic circuitry 202 can select either a legacy algorithm or software aware algorithm tailored and/or designated for a software thread for execution thereof.

Figure 8:
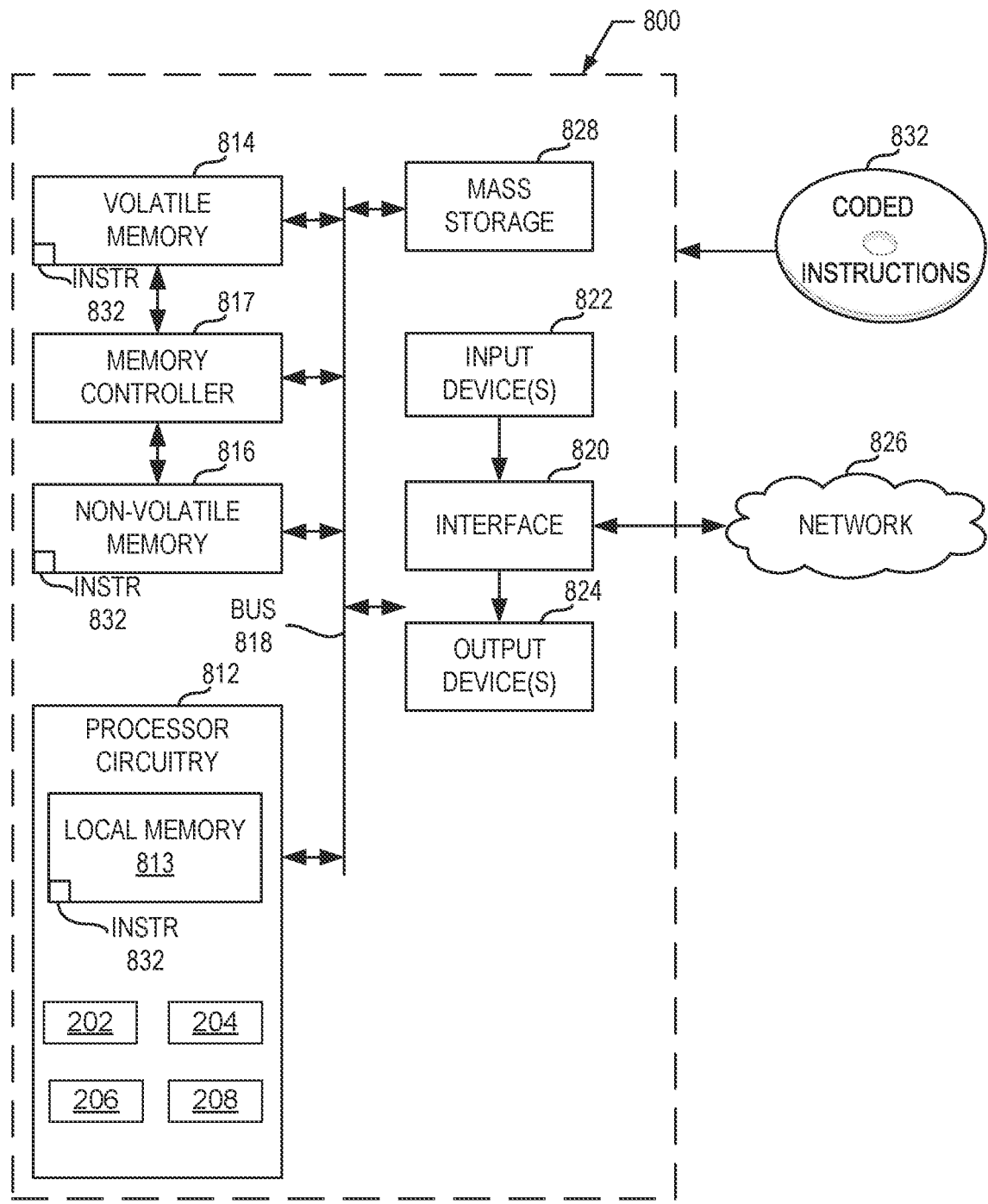
FIG. 8 is a block diagram of an example processing platform including processor circuitry structured to execute the example machine readable instructions and/or the example operations of FIGS. 4-7 to implement the example computing system of FIG. 1 and/or the example SOC implementation of FIG. 2.

FIG. 8 is a block diagram of an example processor platform 800 structured to execute and/or instantiate the machine readable instructions and/or the operations of FIGS. 4-7 to implement the frequency management unit 112 of FIG. 1. The processor platform 800 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 800 of the illustrated example includes processor circuitry 812. The processor circuitry 812 of the illustrated example is hardware. For example, the processor circuitry 812 can be implemented by one or more integrated circuits, logic circuits, FPGAs, microprocessors, CPUs, GPUs, DSPs, and/or microcontrollers from any desired family or manufacturer. The processor circuitry 812 may be implemented by one or more semiconductor based (e.g., silicon based) devices. In this example, the processor circuitry 812 implements the example anti-abuse logic circuitry 202, the anti-cross-thread-contamination logic circuitry 204, the example core pressure compute logic circuitry 206 and the example frequency controller logic circuitry 208.

The processor circuitry 812 of the illustrated example includes a local memory 813 (e.g., a cache, registers, etc.). The processor circuitry 812 of the illustrated example is in communication with a main memory including a volatile memory 814 and a non-volatile memory 816 by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817.

The processor platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 822 are connected to the interface circuitry 820. The input device(s) 822 permit(s) a user to enter data and/or commands into the processor circuitry 812. The input device(s) 822 can be implemented by, for example, an audio sensor, a microphone, a camera (still or video), a keyboard, a button, a mouse, a touchscreen, a track-pad, a trackball, an isopoint device, and/or a voice recognition system.

One or more output devices 824 are also connected to the interface circuitry 820 of the illustrated example. The output device(s) 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 800 of the illustrated example also includes one or more mass storage devices 828 to store software and/or data. Examples of such mass storage devices 828 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 832, which may be implemented by the machine readable instructions of FIGS. 4-7, may be stored in the mass storage device 828, in the volatile memory 814, in the non-volatile memory 816, and/or on a removable non-transitory computer readable storage medium such as a CD or DVD.

Figure 9:
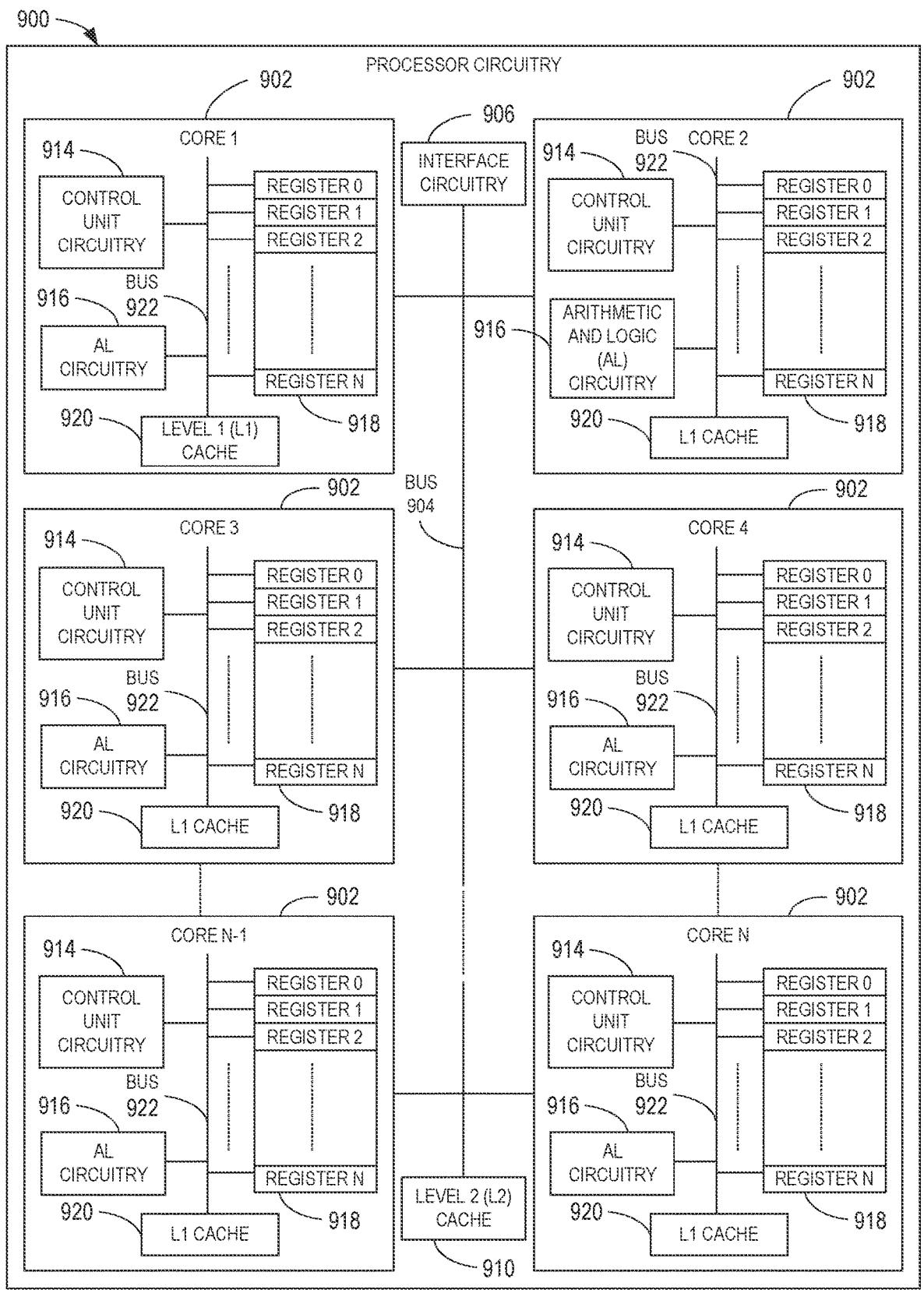
FIG. 9 is a block diagram of an example implementation of the processor circuitry of FIG. 8.

FIG. 9 is a block diagram of an example implementation of the processor circuitry 812 of FIG. 8. In this example, the processor circuitry 812 of FIG. 8 is implemented by a general purpose microprocessor 900. The general purpose microprocessor circuitry 900 executes some or all of the machine readable instructions of the flowcharts of FIGS. 4-8 to effectively instantiate the circuitry of FIG. 2 as logic circuits to perform the operations corresponding to those machine readable instructions. In some such examples, the circuitry of FIG. 2 is instantiated by the hardware circuits of the microprocessor 900 in combination with the instructions. For example, the microprocessor 900 may implement multi-core hardware circuitry such as a CPU, a DSP, a GPU, an XPU, etc. Although it may include any number of example cores 902 (e.g., 1 core), the microprocessor 900 of this example is a multi-core semiconductor device including N cores. The cores 902 of the microprocessor 900 may operate independently or may cooperate to execute machine readable instructions. For example, machine code corresponding to a firmware program, an embedded software program, or a software program may be executed by one of the cores 902 or may be executed by multiple ones of the cores 902 at the same or different times. In some examples, the machine code corresponding to the firmware program, the embedded software program, or the software program is split into threads and executed in parallel by two or more of the cores 902. The software program may correspond to a portion or all of the machine readable instructions and/or operations represented by the flowcharts of FIGS. 4-7.

The cores 902 may communicate by a first example bus 904. In some examples, the first bus 904 may implement a communication bus to effectuate communication associated with one(s) of the cores 902. For example, the first bus 904 may implement at least one of an Inter-Integrated Circuit (I2C) bus, a Serial Peripheral Interface (SPI) bus, a PCI bus, or a PCIe bus. Additionally or alternatively, the first bus 904 may implement any other type of computing or electrical bus. The cores 902 may obtain data, instructions, and/or signals from one or more external devices by example interface circuitry 906. The cores 902 may output data, instructions, and/or signals to the one or more external devices by the interface circuitry 906. Although the cores 902 of this example include example local memory _20 (e.g., Level 1 (L1) cache that may be split into an L1 data cache and an L1 instruction cache), the microprocessor 900 also includes example shared memory 910 that may be shared by the cores (e.g., Level 2 (L2_cache)) for high-speed access to data and/or instructions. Data and/or instructions may be transferred (e.g., shared) by writing to and/or reading from the shared memory 910. The local memory 920 of each of the cores 902 and the shared memory 910 may be part of a hierarchy of storage devices including multiple levels of cache memory and the main memory (e.g., the main memory 814, 816 of FIG. 8). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 902 may be referred to as a CPU, DSP, GPU, etc., or any other type of hardware circuitry. Each core 902 includes control unit circuitry 914, arithmetic and logic (AL) circuitry (sometimes referred to as an ALU) 916, a plurality of registers 918, the L1 cache 920, and a second example bus 922. Other structures may be present. For example, each core 902 may include vector unit circuitry, single instruction multiple data (SIMD) unit circuitry, load/store unit (LSU) circuitry, branch/jump unit circuitry, floating-point unit (FPU) circuitry, etc. The control unit circuitry 914 includes semiconductor-based circuits structured to control (e.g., coordinate) data movement within the corresponding core 902. The AL circuitry 916 includes semiconductor-based circuits structured to perform one or more mathematic and/or logic operations on the data within the corresponding core 902. The AL circuitry 916 of some examples performs integer based operations. In other examples, the AL circuitry 916 also performs floating point operations. In yet other examples, the AL circuitry 916 may include first AL circuitry that performs integer based operations and second AL circuitry that performs floating point operations. In some examples, the AL circuitry 916 may be referred to as an Arithmetic Logic Unit (ALU). The registers 918 are semiconductor-based structures to store data and/or instructions such as results of one or more of the operations performed by the AL circuitry 916 of the corresponding core 902. For example, the registers 918 may include vector register(s), SIMD register(s), general purpose register(s), flag register (s), segment register(s), machine specific register(s), instruction pointer register(s), control register(s), debug register(s), memory management register(s), machine check register(s), etc. The registers 918 may be arranged in a bank as shown in FIG. 5. Alternatively, the registers 918 may be organized in any other arrangement, format, or structure including distributed throughout the core 902 to shorten access time. The second bus 922 may implement at least one of an I2C bus, a SPI bus, a PCI bus, or a PCIe bus Each core 902 and/or, more generally, the microprocessor 900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 900 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 10:
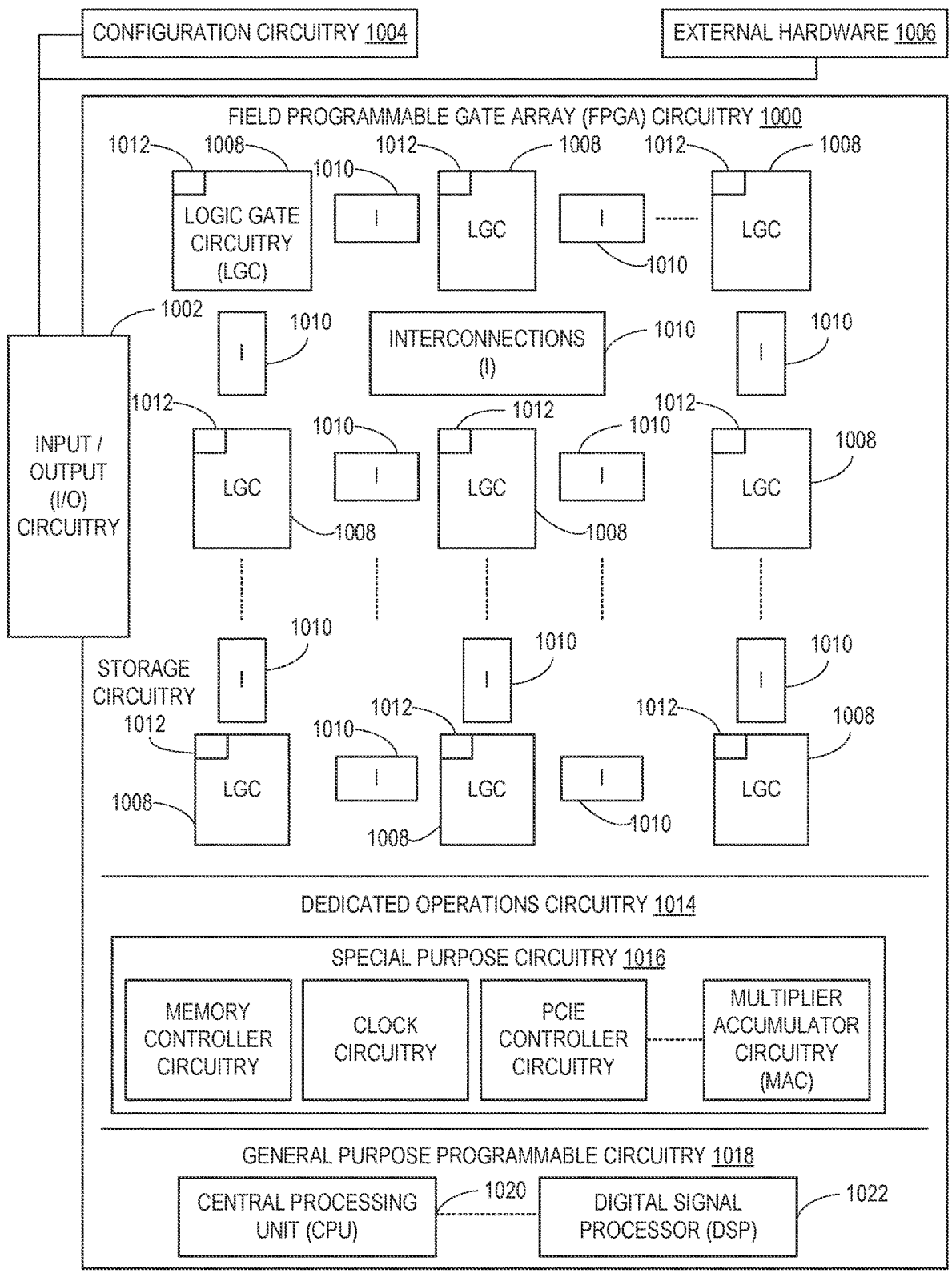
FIG. 10 is a block diagram of another example implementation of the processor circuitry of FIG. 8.

FIG. 10 is a block diagram of another example implementation of the processor circuitry 812 of FIG. 4. In this example, the processor circuitry 812 is implemented by FPGA circuitry 1000. The FPGA circuitry 1000 can be used, for example, to perform operations that could otherwise be performed by the example microprocessor 900 of FIG. 9 executing corresponding machine readable instructions. However, once configured, the FPGA circuitry 1000 instantiates the machine readable instructions in hardware and, thus, can often execute the operations faster than they could be performed by a general purpose microprocessor executing the corresponding software.

More specifically, in contrast to the microprocessor 900 of FIG. 9 described above (which is a general purpose device that may be programmed to execute some or all of the machine readable instructions represented by the flowcharts of FIGS. 4-7 but whose interconnections and logic circuitry are fixed once fabricated), the FPGA circuitry 1000 of the example of FIG. 1 includes interconnections and logic circuitry that may be configured and/or interconnected in different ways after fabrication to instantiate, for example, some or all of the machine readable instructions represented by the flowcharts of FIGS. 4-7. In particular, the FPGA 1000 may be thought of as an array of logic gates, interconnections, and switches. The switches can be programmed to change how the logic gates are interconnected by the interconnections, effectively forming one or more dedicated logic circuits (unless and until the FPGA circuitry 1000 is reprogrammed). The configured logic circuits enable the logic gates to cooperate in different ways to perform different operations on data received by input circuitry. Those operations may correspond to some or all of the software represented by the flowcharts of FIGS. 4-7. As such, the FPGA circuitry 1000 may be structured to effectively instantiate some or all of the machine readable instructions of the flowcharts of FIGS. 4-7 as dedicated logic circuits to perform the operations corresponding to those software instructions in a dedicated manner analogous to an ASIC. Therefore, the FPGA circuitry 1000 may perform the operations corresponding to some or all of the machine readable instructions of FIGS. 4-7 faster than the general purpose microprocessor can execute the same.

In the example of FIG. 10, the FPGA circuitry 1000 is structured to be programmed (and/or reprogrammed one or more times) by an end user by a hardware description language (HDL) such as Verilog. The FPGA circuitry 1000 of FIG. 10, includes example input/output (I/O) circuitry 1002 to obtain and/or output data to/from example configuration circuitry 1004 and/or external hardware (e.g., external hardware circuitry) 1006. For example, the configuration circuitry 1004 may implement interface circuitry that may obtain machine readable instructions to configure the FPGA circuitry 1000, or portion(s) thereof. In some such examples, the configuration circuitry 1004 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1006 may implement the microprocessor 900 of FIG. 9. The FPGA circuitry 1000 also includes an array of example logic gate circuitry 1008, a plurality of example configurable interconnections 1010, and example storage circuitry 1012. The logic gate circuitry 1008 and interconnections 1010 are configurable to instantiate one or more operations that may correspond to at least some of the machine readable instructions of FIGS. 4-7 and/or other desired operations. The logic gate circuitry 1008 shown in FIG. 10 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1008 to enable configuration of the electrical structures and/or the logic gates to form circuits to perform desired operations. The logic gate circuitry 1008 may include other electrical structures such as look-up tables (LUTs), registers (e.g., flip-flops or latches), multiplexers, etc.

The interconnections 1010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1008 to program desired logic circuits.

The storage circuitry 1012 of the illustrated example is structured to store result(s) of the one or more of the operations performed by corresponding logic gates. The storage circuitry 1012 may be implemented by registers or the like. In the illustrated example, the storage circuitry 1012 is distributed amongst the logic gate circuitry 1008 to facilitate access and increase execution speed.

The example FPGA circuitry 1000 of FIG. 10 also includes example Dedicated Operations Circuitry 1014. In this example, the Dedicated Operations Circuitry 1014 includes special purpose circuitry 1016 that may be invoked to implement commonly used functions to avoid the need to program those functions in the field. Examples of such special purpose circuitry 1016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1000 may also include example general purpose programmable circuitry 1018 such as an example CPU 1020 and/or an example DSP 1022. Other general purpose programmable circuitry 1018 may additionally or alternatively be present such as a GPU, an XPU, etc., that can be programmed to perform other operations.

Although FIGS. 9 and 10 illustrate two example implementations of the processor circuitry 812 of FIG. 8, many other approaches are contemplated. For example, as mentioned above, modern FPGA circuitry may include an on-board CPU, such as one or more of the example CPU 1020 of FIG. 10. Therefore, the processor circuitry 812 of FIG. 8 may additionally be implemented by combining the example microprocessor 900 of FIG. 9 and the example FPGA circuitry 1000 of FIG. 10. In some such hybrid examples, a first portion of the machine readable instructions represented by the flowcharts of FIGS. 4-7 may be executed by one or more of the cores 902 of FIG. 9, a second portion of the machine readable instructions represented by the flowcharts of FIGS. 4-7 may be executed by the FPGA circuitry 1000 of FIG. 10, and/or a third portion of the machine readable instructions represented by the flowcharts of FIGS. 4-7 may be executed by an ASIC. It should be understood that some or all of the circuitry of FIG. 1 may, thus, be instantiated at the same or different times. Some or all of the circuitry may be instantiated, for example, in one or more threads executing concurrently and/or in series. Moreover, in some examples, some or all of the circuitry of FIG. 1 may be implemented within one or more virtual machines and/or containers executing on the microprocessor.

In some examples, the processor circuitry 812 of FIG. 8 may be in one or more packages. For example, the processor circuitry 900 of FIG. 9 and/or the FPGA circuitry 1000 of FIG. 10 may be in one or more packages. In some examples, an XPU may be implemented by the processor circuitry 812 of FIG. 8, which may be in one or more packages. For example, the XPU may include a CPU in one package, a DSP in another package, a GPU in yet another package, and an FPGA in still yet another package.

Figure 11:
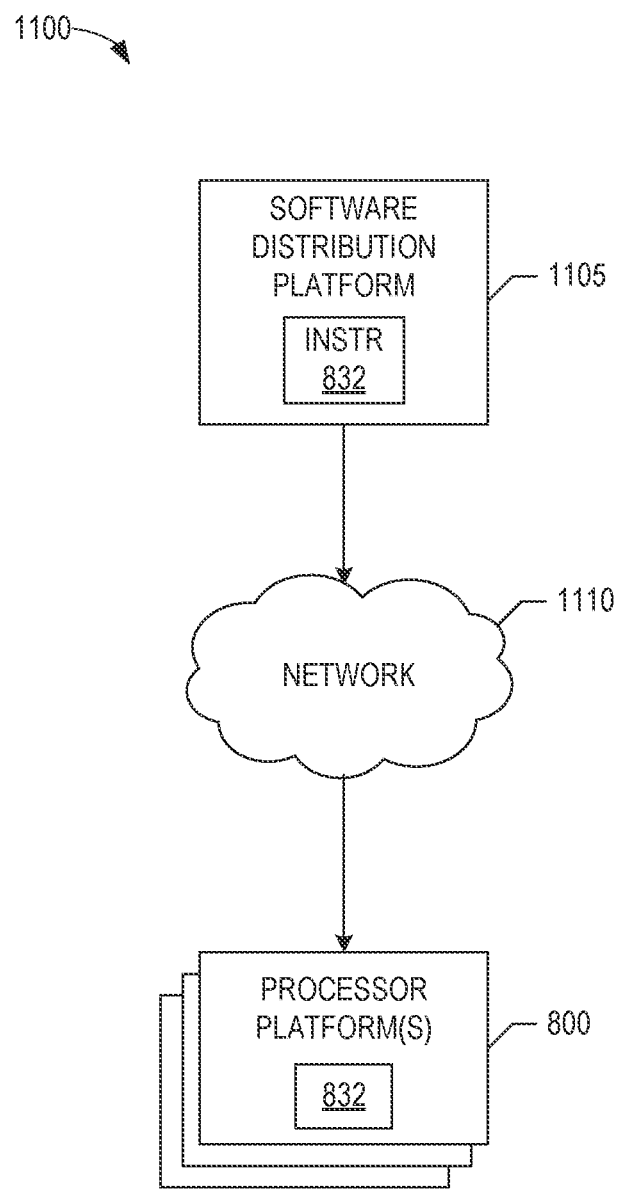
FIG. 11 is a block diagram of an example software distribution platform (e.g., one or more servers) to distribute software (e.g., software corresponding to the example machine readable instructions of FIGS. 4-7) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1105 to distribute software such as the example machine readable instructions 832 of FIG. 8 to hardware devices owned and/or operated by third parties is illustrated in FIG. 11. The example software distribution platform 1105 may be implemented by any computer server, data facility, cloud service, etc., capable of storing and transmitting software to other computing devices. The third parties may be customers of the entity owning and/or operating the software distribution platform 1105. For example, the entity that owns and/or operates the software distribution platform 1105 may be a developer, a seller, and/or a licensor of software such as the example machine readable instructions 832 of FIG. 8. The third parties may be consumers, users, retailers, OEMs, etc., who purchase and/or license the software for use and/or re-sale and/or sub-licensing. In the illustrated example, the software distribution platform 1105 includes one or more servers and one or more storage devices. The storage devices store the machine readable instructions 832, which may correspond to the example machine readable instructions 400, 408, 502, 404 of FIGS. 4-7, as described above. The one or more servers of the example software distribution platform 1105 are in communication with a network 1110. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 832 from the software distribution platform 1105. For example, the software, which may correspond to the example machine readable instructions 400 of FIG. 4, may be downloaded to the example processor platform 800, which is to execute the machine readable instructions 832 to implement the example frequency management unit 112. In some example, one or more servers of the software distribution platform 1105 periodically offer, transmit, and/or force updates to the software (e.g., the example machine readable instructions 832 of FIG. 8) to ensure improvements, patches, updates, etc., are distributed and applied to the software at the end user devices.

Example methods, apparatus, systems, and articles of manufacture to enable bi-directional control of computing units are disclosed herein. Further examples and combinations thereof include the following:

Example 1 includes an apparatus to control a frequency of a computing unit, the apparatus comprising instructions, memory in the apparatus, and processor circuitry to execute the instructions to determine a performance hint from a first register, the performance hint corresponding to a requested performance of the computing unit for executing a thread associated with software, determine power and performance (PnP) statistics pertaining to the thread from a second register, control the frequency of the computing unit based on the performance hint and the PnP statistics, and provide a pressure of the computing unit to the software.

Example 2 includes the apparatus as defined in example 1, wherein the processor circuitry is to execute the instructions to determine a presence of non-compliant instructions from the software based on the performance hint.

Example 3 includes the apparatus as defined in example 2, wherein the processor circuitry is to execute the instructions to place the computing unit in a mode that is independent of the performance hint in response to the presence of the non-compliant instructions.

Example 4 includes the apparatus as defined in example 1, wherein the processor circuitry is to execute the instructions to provide the pressure to the software via a third register.

Example 5 includes the apparatus as defined in example 4, wherein the processor circuitry is to calculate the pressure based on a quotient of an actual frequency of the computing unit during the executing of the thread divided by a maximum frequency of the computing unit.

Example 6 includes the apparatus as defined in example 1, wherein the processor circuitry is to execute the instructions to control the frequency of the computing unit based on whether increasing the frequency will yield a performance increase of the software.

Example 7 includes the apparatus as defined in example 1, wherein the software is to adjust the performance hint in response to the pressure based on accessing the performance hint from a third register.

Example 8 includes the apparatus as defined in example 1, wherein at least one of the PnP statistics or the second register is hidden from the software.

Example 9 includes a system on chip (SOC) package comprising a core to execute a thread corresponding to software, and a frequency management unit communicatively coupled to or including a first register to store a performance hint corresponding to execution of the thread, the performance hint provided to the SOC package from the software, a second register to store a pressure of the core corresponding to the execution of the thread, and a third register to store power and performance (PnP) statistics associated with the execution of the thread by the core, wherein the frequency management unit is to control a frequency of the core based on the performance hint and the PnP statistics, and provide the pressure to the second register for access thereof by the software.

Example 10 includes the SOC package as defined in example 9, wherein the frequency management unit is to determine a presence of non-compliant instructions from the software based on the performance hint.

Example 11 includes the SOC package as defined in example 10, wherein the frequency management unit is to place the core in a mode that is independent of the performance hint in response to the presence of the non-compliant instructions.

Example 12 includes the SOC package as defined in example 10, wherein the frequency management unit is to select the frequency from an array of frequencies based on the performance hint and the PnP statistics.

Example 13 includes the SOC package as defined in example 10, wherein the pressure is equal to a quotient of an actual frequency of the core during the executing of the thread divided by a maximum frequency of the core.

Example 14 includes the SOC package as defined in example 10, wherein at least one of the PnP statistics or the second register is hidden from the software.

Example 15 includes a non-transitory computer readable medium comprising instructions, which when executed, cause at least one processor to determine a performance hint from a first register, the performance hint corresponding to a requested performance of a computing unit for executing a thread associated with software, determine power and performance (PnP) statistics pertaining to the thread from a second register, control a frequency of the computing unit based on the performance hint and the PnP statistics, and provide a pressure of the computing unit to the software via a third register.

Example 16 includes the non-transitory computer readable medium as defined in example 15, wherein the instructions cause the at least one processor to determine a presence of non-compliant instructions from the software.

Example 17 includes the non-transitory computer readable medium as defined in example 16, wherein the instructions cause the at least one processor to place the computing unit in a mode that is independent of the performance hint in response to the presence of the non-compliant instructions.

Example 18 includes the non-transitory computer readable medium as defined in example 15, wherein the instructions cause the at least one processor to select the frequency from an array of frequencies based on the performance hint and the PnP statistics.

Example 19 includes the non-transitory computer readable medium as defined in example 15, wherein the instructions cause the at least one processor to calculate the pressure of the computing unit.

Example 20 includes the non-transitory computer readable medium as defined in example 19, wherein the pressure is calculated based on a quotient of a measured frequency of the computing unit during the executing of the thread divided by a maximum frequency of the computing unit.

Example 21 includes a method of controlling a frequency of computing unit, the method comprising determining, by executing instructions with at least one processor, a performance hint from a first register, the performance hint corresponding to a requested performance of the computing unit for executing a thread associated with software, determining, by executing instructions with the at least one processor, power and performance (PnP) statistics pertaining to the thread from a second register, controlling, by executing instructions with the at least one processor, the frequency of the computing unit based on the performance hint and the PnP statistics, and providing, by executing instructions with the at least one processor, a pressure of the computing unit to the software.

Example 22 includes the method as defined in example 21, further including determining, by executing instructions with the at least one processor, a presence of non-compliant instructions based on the performance hint.

Example 23 includes the method as defined in example 22, further including setting, by executing instructions with the at least one processor, the computing unit in a mode that is independent of the performance hint in response to the presence of the non-compliant instructions.

Example 24 includes the method as defined in example 21, further including selecting, by executing instructions with the at least one processor, the frequency from an array of frequencies based on the performance hint and the PnP statistics.

Example 25 includes the method as defined in example 21, further including calculating, by executing instructions with the at least one processor, the pressure of the computing unit.

Example 26 includes the method as defined in example 25, wherein the pressure is calculated based on a quotient of an actual frequency of the computing unit during the executing of the thread divided by a maximum frequency of the computing unit.

From the foregoing, it will be appreciated that example systems, methods, apparatus, and articles of manufacture have been disclosed that enable energy-efficient control of computing units and/or IPs. Accordingly, examples disclosed herein can improve power efficiency without significant negative impacts to overall computational performance. Examples disclosed herein can also prevent erroneous and/or abusive control of the computing units with a secure control system that is not accessible by software. Disclosed systems, methods, apparatus, and articles of manufacture improve the efficiency of using a computing device, a processor/SOC package and/or a computing unit, such as a processor core or memory controller, by increasing power-efficiency of application execution while maintaining desired performance levels of software executed thereby. Disclosed systems, methods, apparatus, and articles of manufacture are accordingly directed to one or more improvement(s) in the operation of a machine such as a computer or other electronic and/or mechanical device. It has been demonstrated in early concepts that use of examples disclosed herein can maintain a similar performance (e.g., a similar frame rate for a videoconferencing application) to known systems but can reduce power consumption by approximately 20-30%. In some particular early testing, a reduction of approximately 5 watts (W) was demonstrated from a previous power consumption of 15 W to 20 W of total power consumption.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to control a frequency of a computing unit, the apparatus comprising:
   instructions;
   memory; and
   at least one programmable circuitry to be programmed by the instructions to:
      determine a performance hint from a first register, the performance hint corresponding to a requested performance of the computing unit for when executing a software thread,
      determine a presence of one or more non-compliant instructions in the software thread based on the performance hint,
      determine power and performance (PnP) statistics pertaining to the software thread from a second register,
      control the frequency of one or more of the at least one programmable circuit based on the performance hint and the PnP statistics, and
      provide pressure data associated with execution of the software thread by the computing unit to the software.

2. The apparatus as defined in claim 1, wherein one or more of the at least one programmable circuitry is to place the computing unit in a mode that is independent of the performance hint after detection of the presence of the one or more non-compliant instruction.

3. The apparatus as defined in claim 1, wherein one or more of the at least one programmable circuitry is to provide the pressure data to the software via a third register.

4. The apparatus as defined in claim 3, wherein one or more of the at least one programmable circuitry is to calculate the pressure data based on a quotient of an actual frequency of the computing unit during the executing of the software thread divided by a maximum frequency of the computing unit.

5. The apparatus as defined in claim 1, wherein one or more of the at least one programmable circuitry is to control the frequency of the computing unit based on whether increasing the frequency will yield a performance increase of the software.

6. The apparatus as defined in claim 1, wherein the software thread is to adjust the performance hint in response to the pressure data after accessing the performance hint from a third register.

7. The apparatus as defined in claim 1, wherein at least one of the PnP statistics or the second register is hidden from the software thread.

8. A system on chip (SOC) package comprising:
   at least one core to execute software;
   instructions; and
   a first register to store a performance hint corresponding to execution of the software, the performance hint provided to the SOC package by the software,
   a second register to store pressure data associated with the execution of the software by the at least one core, and a third register to store power and performance (PnP) statistics associated with the execution of the software by the at least one core, at least one core to be programmed by the instructions to;
control a frequency of one or more of the at least one core based on the performance hint and the PnP statistics, and provide the pressure data to the second register for access thereof by the software, and
determine a presence of one or more non-compliant instructions in the software based on the performance hint.

9. The SOC package as defined in claim 8, wherein one or more of the at least one core is to enter a mode that is independent of the performance hint in response to the presence of the one or more non-compliant instructions.

10. The SOC package as defined in claim 8, wherein one or more of the at least one core is to select the frequency from an array of frequencies based on the performance hint and the PnP statistics.

11. The SOC package as defined in claim 8, wherein the pressure data is based on a quotient of an actual frequency of the at least one core during the executing of the software divided by a maximum frequency of the at least one core.

12. The SOC package as defined in claim 8, wherein at least one of the PnP statistics or the second register is hidden from the software.

13. A non-transitory computer readable medium comprising instructions to cause programmable circuitry to:
determine a performance hint from a first register, the performance hint corresponding to a requested performance of the programmable circuitry when executing software;
determine a presence of a non-compliant instruction in the software;
determine power and performance (PnP) statistics pertaining to the software from a second register;
control a frequency of the programmable circuitry based on the performance hint and the PnP statistics; and
provide pressure data associated with execution of the software via a third register.

14. The non-transitory computer readable medium as defined in claim 13, wherein the instructions cause the programmable circuitry to enter a mode that is independent of the performance hint in response to the presence of the non-compliant instruction.

15. The non-transitory computer readable medium as defined in claim 13, wherein the instructions cause the programmable circuitry to select the frequency from an array of frequencies based on the performance hint and the PnP statistics.

16. The non-transitory computer readable medium as defined in claim 13, wherein the instructions cause the programmable circuitry to calculate the pressure data.

17. The non-transitory computer readable medium as defined in claim 16, wherein the pressure data is based on a quotient of a measured frequency of the programmable circuitry during the executing of the software and a maximum frequency of the programmable circuitry.

18. A method of controlling a frequency of a computing unit, the method comprising:
determining, by executing instructions with at least one programmable circuitry, a performance hint from a first register, the performance hint corresponding to a requested performance of the computing unit for executing a thread associated with software;
determining, by executing instructions with one or more of the at least one programmable circuitry, a presence of non-compliant instructions based on the performance hint;
determining, by executing instructions with one or more of the at least one programmable circuitry, power and performance (PnP) statistics pertaining to the thread from a second register;
controlling, by executing instructions with one or more of the at least one programmable circuitry, the frequency of the computing unit based on the performance hint and the PnP statistics; and
providing, by executing instructions with one or more of the at least one programmable circuitry, a pressure of the computing unit to the software.

19. The method as defined in claim 18, including setting, by executing instructions with one or more of the at least one programmable circuitry, the computing unit in a mode that is independent of the performance hint in response to the presence of the non-compliant instructions.

20. The method as defined in claim 18, including selecting, by executing instructions with one or more of the at least one programmable circuitry, the frequency from an array of frequencies based on the performance hint and the PnP statistics.

21. The method as defined in claim 18, including calculating, by executing instructions with one or more of the at least one programmable circuitry, the pressure of the computing unit.

22. The method as defined in claim 21, wherein the pressure is calculated based on a quotient of an actual frequency of the computing unit during the executing of the thread divided by a maximum frequency of the computing unit.

* * * * *

UNITED STATES PATENT AND TRADEMARK OFFICE
CERTIFICATE OF CORRECTION

PATENT NO. : 12,416,964 B2
APPLICATION NO. : 17/557034
DATED : September 16, 2025
INVENTOR(S) : Dai et al.

Page 1 of 1

It is certified that error appears in the above-identified patent and that said Letters Patent is hereby corrected as shown below:

In the Claims

In Column 27, Claim 8, Line 4, insert --the-- before "at least one".
In Column 27, Claim 8, Line 4, delete ";" and insert --:--.

Signed and Sealed this
Twenty-eighth Day of October, 2025

John A. Squires
*Director of the United States Patent and Trademark Office*